United States Patent
Uchiyama et al.

(10) Patent No.: US 9,841,540 B2
(45) Date of Patent: Dec. 12, 2017

(54) COATING MATERIAL COMPOSITION, AND LIGHT-DIFFUSING MEMBER MANUFACTURED USING SAID COATING MATERIAL COMPOSITION

(71) Applicant: Panasonic Intellectual Property Management Co., Ltd., Osaka (JP)

(72) Inventors: Shuhei Uchiyama, Osaka (JP); Toshiharu Sako, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/037,131

(22) PCT Filed: Oct. 9, 2014

(86) PCT No.: PCT/JP2014/005148
§ 371 (c)(1),
(2) Date: May 17, 2016

(87) PCT Pub. No.: WO2015/079613
PCT Pub. Date: Jun. 4, 2015

(65) Prior Publication Data
US 2016/0282521 A1 Sep. 29, 2016

(30) Foreign Application Priority Data

Nov. 29, 2013 (JP) .................. 2013-247043

(51) Int. Cl.
*F21V 11/00* (2015.01)
*G02B 5/02* (2006.01)
(Continued)

(52) U.S. Cl.
CPC ........... *G02B 5/0226* (2013.01); *C09D 7/125* (2013.01); *C09D 7/1216* (2013.01);
(Continued)

(58) Field of Classification Search
CPC .... C09D 7/1216; C09D 7/125; C09D 127/12; G02B 5/021; G02B 5/0205; G02B 5/0226;
(Continued)

(56) References Cited

U.S. PATENT DOCUMENTS

| | | |
|---|---|---|
| 4,909,915 A | 3/1990 | Bederke et al. |
| 2001/0056166 A1 | 12/2001 | Mohri et al. |
| 2013/0083544 A1 | 4/2013 | Hosoda et al. |

FOREIGN PATENT DOCUMENTS

| | | |
|---|---|---|
| CN | 87 1 05636 A | 3/1988 |
| CN | 101116013 A | 1/2008 |

(Continued)

OTHER PUBLICATIONS

Chinese Office Action dated Jan. 25, 2017 for corresponding Chinese Application No. 201480062837.7 and English translation.

(Continued)

*Primary Examiner* — Laura Gudorf
(74) *Attorney, Agent, or Firm* — Renner, Otto, Boisselle & Sklar, LLP

(57) ABSTRACT

A coating material composition include a hydroxyl group-containing acrylic resin, a fluororesin, and light diffusive particles, and the hydroxyl group-containing acrylic resin has a weight-average molecular weight in a range of 10,000 to 30,000 and a hydroxyl value in a range of 14 to 70, wherein a mass ratio of the fluororesin to the hydroxyl group-containing acrylic resin (the fluororesin/the hydroxyl group-containing acrylic resin) is in a range of 5/95 to 50/50. The coating material composition can provide the light diffusing properties capable of uniformly diffusing light while effectively masking a light source image.

7 Claims, 1 Drawing Sheet

(51) Int. Cl.
*C09D 201/04* (2006.01)
*F21V 3/00* (2015.01)
*F21V 3/04* (2006.01)
*C09D 133/06* (2006.01)
*C09D 7/12* (2006.01)
*C09D 127/12* (2006.01)
*G02B 1/04* (2006.01)

(52) U.S. Cl.
CPC ......... *C09D 7/1283* (2013.01); *C09D 7/1291* (2013.01); *C09D 127/12* (2013.01); *C09D 133/066* (2013.01); *C09D 201/04* (2013.01); *F21V 3/00* (2013.01); *F21V 3/04* (2013.01); *F21V 3/049* (2013.01); *F21V 3/0472* (2013.01); *G02B 1/04* (2013.01); *G02B 5/02* (2013.01); *G02B 5/0242* (2013.01)

(58) Field of Classification Search
CPC ............ G02B 5/020205; G02B 5/0236; G02B 5/0242; G02B 5/0278
See application file for complete search history.

(56) References Cited

FOREIGN PATENT DOCUMENTS

| | | |
|---|---|---|
| JP | 64-009274 A | 1/1989 |
| JP | 2006-152080 A | 6/2006 |
| JP | 2007-286088 A | 11/2007 |
| JP | 2011-209658 A1 | 10/2011 |
| JP | 2012-161966 A | 8/2012 |
| JP | 2012-208424 A | 10/2012 |
| WO | WO 97/11130 A1 | 3/1997 |

OTHER PUBLICATIONS

International Search Report for corresponding International Application No. PCT/JP2014/005148 dated Jan. 20, 2015.
Form PCT/ISA/237 for corresponding International Application No. PCT/JP2014/005148 dated Jan. 20, 2015.
International Preliminary Report on Patentability for corresponding International Application No. PCT/JP2014/005148 dated Jun. 9, 2015.

COATING MATERIAL COMPOSITION, AND LIGHT-DIFFUSING MEMBER MANUFACTURED USING SAID COATING MATERIAL COMPOSITION

TECHNICAL FIELD

The present invention relates to a coating material composition and a light diffusing member using the coating material composition. More particularly, the present invention relates to a coating material composition including a predetermined combination of resins, and a light diffusing member having high light utilization efficiency and including a light diffusing layer formed by the coating material composition.

BACKGROUND ART

Light diffusing members, such as covers for lighting fixtures, cover the front surface side of the lighting fixtures and diffuse light from light sources over the entire surfaces of the covers so as to uniformly transmit the light and prevent unevenness of brightness on the light-transmitting surfaces. At the same time, the light diffusing members mask the image of the light sources so as to enhance the quality of appearance of the lighting fixtures.

Conventional light diffusing members are manufactured by molding resin sheets containing white pigments. Examples of white inorganic pigments used include silicon oxide, barium sulfate, calcium carbonate, titanium oxide, mica, magnesium oxide, talc, aluminum hydroxide, and aluminum oxide. These pigments can diffuse light but may decrease transmittance of light as the amount of the pigments added increases, which inevitably leads to poor brightness. Furthermore, inorganic particles of these materials may degrade surfaces of the light diffusing members and cause chalking.

There is known a light diffusive coating composition containing an acrylic resin, a fluororesin and organic fine particles that can solve the conventional problems (for example, Patent Literature 1). The composition can provide a high light diffusive layer. However, there remains a need for improvement in transmittance when the composition is used for LED lighting fixtures which have received increased attention. Since the reason for using LED lighting fixtures is to provide energy savings, higher light transmittance is required for cover members for LED lighting fixtures than that required for conventional cover members for fluorescent lights. Furthermore, since LED light sources have high directivity, higher light diffusibility is also required so that the LED light sources are not recognized as point light sources.

In order to achieve both high light diffusibility including a function to mask a light source image and high light transmittance, there is proposed a light diffusing body including a transparent substrate, an internal scattering layer and a surface shaping layer provided on the substrate, the internal scattering layer including particles and a binder (for example, Patent Literature 2). Patent Literature 2 teaches that a refractive index difference between the particles and the binder set to a predetermined value or smaller, and the particles have a mean particle diameter within a predetermined range, so as to exhibit high masking performance and light utilization efficiency.

CITATION LIST

Patent Literature

Patent Literature 1: Japanese Unexamined Patent Application Publication No. 2012-208424
Patent Literature 2: Japanese Unexamined Patent Application Publication No. 2011-209658

SUMMARY OF INVENTION

The light diffusing body described in Patent Literature 2, however, requires a stacked body including at least two layers of the internal scattering layer and the surface shaping layer. The light diffusing body inevitably has a three-layer structure when further including a low refractive index layer, which leads to a complicated process and an increase in cost. Furthermore, the light diffusing body has a film shape which makes it difficult to apply the light diffusing body to members having different shapes such as light diffusing covers for LED ceiling lights.

Other disclosures also teach the use of a low refractive index layer in order to increase light transmittance and typically teach that a plurality of functional layers are stacked on a substrate, and the low refractive index layer is provided on the outermost surface. A diffusing layer may be formed only by a resin having a low refractive index such as a fluororesin; however, a fluororesin has low wettability to other substrates and is an expensive material.

An object of the present invention is to provide a coating material composition that can provide preferred light diffusing effects and light transmittance to, for example, LED lighting so as to achieve high light utilization efficiency, and a light diffusing member using the coating material composition having a simple configuration without including an additional low refractive index layer.

An aspect of the present invention is to provide a coating material composition including a hydroxyl group-containing acrylic resin, a fluororesin, and light diffusive particles, the hydroxyl group-containing acrylic resin having a weight-average molecular weight in a range of 10,000 to 30,000 and a hydroxyl value in a range of 14 to 70, wherein a mass ratio of the fluororesin to the hydroxyl group-containing acrylic resin (the fluororesin/the hydroxyl group-containing acrylic resin) is in a range of 5/95 to 50/50.

DESCRIPTION OF EMBODIMENTS

Figure 1:
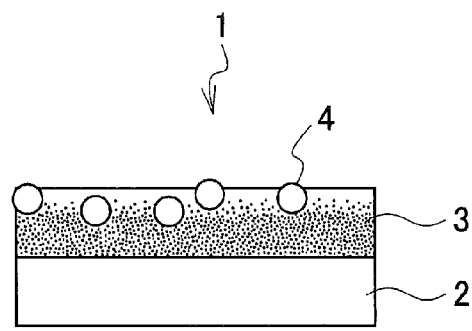
FIG. 1 is a cross-sectional view of a light diffusing member according to an embodiment of the present invention.

A coating material composition according to an embodiment of the present invention includes a hydroxyl group-containing acrylic resin, a fluororesin, and light diffusive particles. The hydroxyl group-containing acrylic resin has a weight-average molecular weight in the range of 10,000 to 30,000 and a hydroxyl value in the range of 14 to 70. A mass ratio of the fluororesin to the hydroxyl group-containing acrylic resin (the fluororesin/the hydroxyl group-containing acrylic resin) is in the range of 5/95 to 50/50. The respective components and a method of preparing the coating material composition will hereinafter be described.

<Hydroxyl Group-Containing Acrylic Resin>

The hydroxyl group-containing acrylic resin in the present embodiment is a copolymer of polymerizable unsaturated monomers having a hydroxyl group and other unsaturated monomers copolymerizable with the monomers having a hydroxyl group.

The hydroxyl group-containing monomers may be at least one kind selected from the group consisting of: a hydroxyalkyl (meth)acrylate monomer such as hydroxymethyl (meth)acrylate, hydroxyethyl (meth)acrylate, hydroxypropyl (meth)acrylate, and hydroxybutyl (meth)acrylate; a modified hydroxyalkyl (meth)acrylate ester monomer such as ε-caprolactone-modified hydroxyethyl (meth)acrylate (PLACCEL (registered trademark) FM1 (trade name) available from Daicel Chemical Industries, Ltd.); a dihydroxyalkyl ester monomer of an unsaturated carboxylic acid such as itaconic acid, crotonic acid, and maleic acid; a hydroxy ether monomer such as a hydroxyalkyl vinyl ether monomer; and a polyalkylene glycol (meth)acrylate ester monomer such as polyethylene glycol monoacrylate, monomethacrylate, polypropylene glycol monoacrylate, and monomethacrylate. As used herein, the term "(meth)acrylic" refers to acrylic or methacrylic.

The other unsaturated monomers copolymerizable with the unsaturated monomers may be at least one selected from the group consisting of: a (meth)acrylate ester monomer such as (meth)acrylic acid, methyl (meth)acrylate, methylethyl (meth)acrylate, propyl (meth)acrylate, butyl (meth)acrylate, hexyl (meth)acrylate, and ethyl hexyl (meth)acrylate; a (meth)acrylonitrile monomer such as acrylonitrile and methacrylonitrile; and a (meth)acrylamide monomer such as acrylamide, methacrylamide, N-methylol acrylamide, N,N-dimethylacrylamide, and diacetone acrylamide.

Other unsaturated monomers other than the (meth)acrylic monomers may be at least one selected from the group consisting of: a vinyl alcohol ester monomer of vinyl alcohol and a carboxylic acid such as acetic acid; an aromatic monomer such as styrene and vinyl naphthalene; and an unsaturated aliphatic monomer such as butadiene and isoprene.

The hydroxyl group-containing acrylic resin has the hydroxyl value in the range of 14 to 70 mg/g, preferably from 14 to 45 mg/g. The resin with the hydroxyl value in the above-described range can achieve high light diffusibility and light transmittance when combined with the fluororesin described below. The hydroxyl value may be obtained in a manner such that the hydroxyl group is first acetylated and an excessive amount of an acetylating agent is titrated with potassium hydroxide.

The hydroxyl group-containing acrylic resin has the weight-average molecular weight in the range of 10,000 to 30,000, preferably from 15,000 to 20,000. The resin with the weight-average molecular weight in the above-described range can achieve high light transmittance and further coating physical properties such as chemical resistance and hardness when combined with the fluororesin described below. The weight-average molecular weight may be obtained by gel filtration chromatography on the basis of polystyrene.

As an example, FU-355-BA (available from DIC Corporation) or WCU865 (available from DIC Corporation) may suitably be used as the hydroxyl group-containing acrylic resin in the present embodiment.

<Fluororesin>

The fluororesin according to the present embodiment includes a polymer and a copolymer of fluorine-containing monomers. Examples of the fluorine-containing monomers include a fluorine-containing (meth)acrylate monomer and a fluorine-containing olefin monomer. The former monomer may be at least one selected from the group consisting of trifluoromethyl (meth)acrylate, trifluoroethyl (meth)acrylate, perfluorodecyl ethyl (meth)acrylate, perfluorooctyl ethyl (meth)acrylate, perfluorohexyl ethyl (meth)acrylate, perfluorobutyl ethyl (meth)acrylate, and perfluoropolyether ethyl (meth)acrylate. The latter monomer may be at least one selected from the group consisting of tetrafluoroethylene, chlorotrifluoroethylene, hexafluoropropylene, and perfluoropropyl vinyl ether. As used herein, the term "(meth)acrylic" refers to acrylic or methacrylic, as described above.

Monomers copolymerizable with the fluorine-containing monomers may be at least one selected from the group consisting of the monomers as listed in the hydroxyl group-containing acrylic resin, and a polyol fluororesin such as a fluoroethylene-vinyl ether (vinyl ester) copolymer and a copolymer obtained in such a manner as to introduce a fluoroalkylene group or perfluoroalkyl group when synthesizing a polyol resin.

A preferable example of the fluororesin is a polyfluoroolefin resin. This resin may be formed by the fluorine-containing olefin monomer described above, and examples thereof include resins having repeat units represented by —$CF_2$—$CF_2$— and —$CF_2$—CFX— (where X is a perfluoroalkyl group such as hydrogen, Cl, Br or $CF_3$).

Although not intended to limit the scope of the present embodiment, the fluororesin has a lower refractive index than the hydroxyl group-containing acrylic resin and has C—F bonds with low surface free energy. Therefore, the fluororesin is present in a larger amount than the amount of the hydroxyl group-containing acrylic resin on the surface side of a light diffusing layer, which presumably leads to high light transmittance. In addition, the fluororesin presumably contributes to stain resistance and water repellency due to its low surface tension.

The fluororesin is contained such that the mass ratio of the fluororesin to the hydroxyl group-containing acrylic resin (the fluororesin/the hydroxyl group-containing acrylic resin) is in the range of 5/95 to 50/50. The mass ratio within the above-mentioned range can not only improve the light transmittance but also facilitate handling so as to form a uniform coating. The mass ratio is preferably in the range of 20/80 to 50/50. The mass ratio is a solids ratio which is set to the above-described range when the respective resins are dissolved or dispersed in a solvent.

<Light Diffusive Particles>

The light diffusive particles may be conventionally-used optional inorganic and/or organic particles. The inorganic particles may be at least one selected from the group consisting of silicon dioxide, aluminum oxide, titanium dioxide, zirconium oxide, tin oxide, calcium carbonate, barium sulfate, kaolin, and calcium sulfate. The organic particles may be at least one selected from the group consisting of poly(meth)acrylic particles, polystyrene particles, silicone particles, polycarbonate particles, acryl-styrene copolymer particles, benzoguanamine resin particles, melamine resin particles, polyolefin particles, polyester particles, polyamide particles, polyimide particles, and polyethylene fluoride particles. These particles may be either crosslinked or non-crosslinked. The particles are particularly preferably at least one selected from the group consisting of benzoguanamine resin, acryl-styrene copolymer, silicone, and melamine resin.

The average particle size ($d_{50}$) of the light diffusive particles is preferably in the range of 0.8 µm to 15 µm. The average particle size ($d_{50}$) of the light diffusive particles is more preferably in the range of 1 µm to 5 µm. The average particle size in the above-described range can facilitate scattering of visible light, so as to sufficiently mask the LED light source image. The average particle size in the above-described range, although depending on the thickness of the light diffusing layer, can provide sufficient coating strength. The average particle size of the light diffusive particles in the coating material composition may be obtained with a laser diffraction particle size analyzer.

The coating material composition including the particles with the average particle size in the above-described range, when applied to a substrate in a thickness of 5 µm to 15 µm, is suitable for forming a rugged surface having an arithmetic mean roughness (Ra) in the range of 1 µm to 10 µm. When two or more kinds of light diffusive particles are included, a combination of particles having different average particle sizes is preferable so as to ensure the surface roughness described above.

Preferably, a refractive index difference between the light diffusive particles and the hydroxyl group-containing acrylic resin is in the range of 0.05 to 0.25. The refractive index difference in this range can ensure light diffusibility sufficient to mask the LED light source image and minimize a reduction in luminous transmittance. As used herein, the term "refractive index" refers to a value at the NaD-line (589 nm) measured with an Abbe refractometer.

As described above, the refractive index difference between the light diffusive particles and the hydroxyl group-containing acrylic resin is preferably in the range of 0.05 to 0.25, and the average particle size ($d_{50}$) of the light diffusive particles is preferably in the range of 0.8 µm to 15 µm.

The light diffusive particles are preferably contained in an amount of from 25 to 150 parts by mass, more preferably from 40 to 120 parts by mass, most preferably from 60 to 100 parts by mass, based on 100 parts by mass of the hydroxyl group-containing acrylic resin and the fluororesin combined together. The amount of the light diffusive particles in the above-described range can ensure sufficient light diffusibility without significantly reducing the luminous transmittance.

<Preparation Method>

The coating material composition according to the present embodiment may be manufactured in a manner such that the respective components are added to an organic solvent concurrently or sequentially and mixed together by a conventional stirring or mixing method. The organic solvent may be any solvents that can dissolve or disperse the hydroxyl group-containing acrylic resin and the fluororesin. The solvent may be at least one selected from the group consisting of: an aromatic solvent such as toluene and xylene; a ketone solvent such as methyl ethyl ketone and cyclohexanone; and an ester solvent such as ester acetate. In order to facilitate uniform coating, a non-volatile content of the coating material composition is preferably from about 10% to 30% by mass.

The coating material composition may optionally contain commonly-used additives in amounts without departing from the scope of the present embodiment. Such additives may be at least one selected from the group consisting of a UV absorber, a light stabilizer, a defoaming agent, and a leveling agent. The UV absorber may be at least one selected from the group consisting of a benzotriazole UV absorber, a triazine UV absorber and the like, and a salicylic acid derivative UV absorber. The light stabilizer may be a hindered amine stabilizer, and the defoaming agent may be one of various types of surfactants.

<Light Diffusing Member>

The light diffusing member according to the present embodiment includes the transparent substrate, and the light diffusing layer applied on one surface of the transparent substrate and formed by the coating material composition according to the present embodiment. FIG. 1 is a cross-sectional view showing an embodiment of the light diffusing member. The light diffusing member 1 includes the light diffusing layer 3 on one surface of the transparent substrate 2, the light diffusing layer 3 being obtained in a manner such that the coating material composition of the present embodiment is applied onto one surface of the transparent substrate 2. The light diffusive particles 4 are added to the light diffusing layer 3.

As described above, the proportion of the fluororesin with respect to the hydroxyl group-containing acrylic resin (the fluororesin/the hydroxyl group-containing acrylic resin) by mass in the light diffusing layer is assumed to be larger on the surface side of the light diffusing layer than on the transparent substrate side, which, however, should not be construed as limiting the present embodiment. As schematically shown by shading in FIG. 1, it is believed that transparency is higher on the surface side and therefore, the single light diffusing layer can achieve high light diffusibility and light transmittance.

A light source (not shown) may be arranged either on the light diffusing layer 3 side or on the transparent substrate 2 side. Typically, surfaces of covers for lighting fixtures preferably have a mat texture. Thus, the light source is preferably arranged on the transparent substrate 2 side so that the light diffusing layer is located on the outer side.

The transparent substrate 2 may be formed by any materials that have transparency at least in the visible light region (380 nm to 830 nm). For example, the transparent substrate 2 may be formed by at least one selected from the group consisting of: a (meth)acrylate resin such as a polymethyl methacrylate resin; a polyester resin such as polyethylene terephthalate; a polycarbonate resin; a polystyrene resin; and glass. The transparent substrate 2 is particularly preferably formed by at least one selected from the group consisting of a (meth)acrylate resin, a polycarbonate resin, and a polystyrene resin because these resins have high visible light transmittance.

The thickness of the transparent substrate 2 is preferably in the range of about 0.1 mm to 3 mm when formed into different shapes depending on the molding of covers such as ceiling covers, although the thickness is not limited when used for, for example, flat base lights.

The transparent substrate 2 preferably has total luminous transmittance of 90% to 100%, a haze of 0% to 1%, and diffusivity of 0% to 1%. These values may be measured with a haze meter (for example, NDH 2000 (trade name) available from Nippon Denshoku Industries Co., Ltd.).

The light diffusing layer 3 is formed in a manner such that the coating material composition of the present embodiment is applied onto one surface of the transparent substrate 2, followed by curing. The method of applying the coating material composition may be at least one method selected from the group consisting of spray coating, bar coating, dip coating, flow coating, spin coating, roll coating, and sponge coating. Other examples of methods of forming the light diffusing layer 3 include a method of forming the coating material composition into a sheet and stacking it on the transparent substrate 2, and a method of spraying the coating material composition on an inner surface of a metal mold and then applying the transparent substrate 2 to the metal mold, followed by molding.

Examples of methods of curing the coating material composition include a method of removing the organic solvent from the coating material composition by heating, and a method of adding a curing agent, followed by heat-curing. The heating may be performed at a temperature of a boiling point or higher of the organic solvent for from about 5 minutes to 1 hour. The curing agent may be any types that can react with the OH group to provide crosslinking. Examples of curing agents include an isocyanate-based curing agent and an amino-based curing agent, and an isocyanate-based curing agent is preferable. The isocyanate-based curing agent may be at least one selected from the group consisting of: aliphatic diisocyanates such as lysine diisocyanate, hexamethylene diisocyanate, and trimethyl hexane diisocyanate; alicyclic diisocyanates such as hydrogenated xylylene diisocyanate, isophorone diisocyanate, methylcyclohexane-2,4-diisocyanate, methylcyclohexane-2, 6-diisocyanate, 4,4'-methylenebis(cyclohexylisocyanate), and 1,3-(isocyanatomethyl)cyclohexane; aromatic diisocyanates such as tolylene diisocyanate, xylylene diisocyanate, and diphenylmethane diisocyanate; organic polyisocyanates including trivalent or polyvalent polyisocyanates such as lysine triisocyanate; an adduct of the respective organic polyisocyanates and components such as a polyvalent alcohol, a polyester resin with a low molecular weight, or water; cyclized polymers of the several types of organic diisocyanates (for example, isocyanurate); and biuret type adducts. The isocyanate-based curing agent is preferably contained such that an equivalent ratio (NCO/OH) of an isocyanate group (NCO) of an isocyanate resin to the hydroxyl group (OH) contained in the hydroxyl group-containing acrylic resin is in the range of from 0.2 to 2.0, preferably from 0.5 to 1.5. The amino resin may be at least one selected from the group consisting of a melamine resin, a benzoguanamine resin, a glycoluril resin, and a urea resin.

The arithmetic mean roughness (Ra) of the light diffusing layer 3 is preferably in the range of from 1 μm to 10 μm, more preferably from 2 μm to 7 μm. The thickness of the light diffusing layer 3 is typically in the range of from 5 μm to 50 μm, preferably from 5 μm to 15 μm.

As described above, the light diffusing member 1 according to the present embodiment can be manufactured by a simple process. The light diffusing member 1 is suitably used for covers for lighting, particularly for covers for LED lighting, and exhibits high masking performance on the light source image. Further, the light diffusing member 1 has high total luminous transmittance and light utilization efficiency. Therefore, it is preferably used as covers including the light diffusing member 1 for lighting, particularly covers including the light diffusing member 1 for LED lighting. It should be understood that the light diffusing member 1 according to the present embodiment need not be used for covers for lighting but may suitably be used for other light diffusing applications such as backlight units for liquid crystal display devices. The following examples are intended to illustrate the present embodiment.

EXAMPLES

Example 1

An acrylic plate formed by an acrylic resin (50 mm×70 mm×2 mm (thickness); refractive index: 1.49; transmittance: 92.5%; haze: 0.2%; diffusivity: 0%) was used as a transparent substrate. As a hydroxyl group-containing acrylic resin, FU-355-BA (trade name) (available from DIC Corporation; refractive index: 1.49; hydroxyl value: 45; weight-average molecular weight: 16,000) was used. As a fluororesin, Fclear (registered trademark) KD100 (trade name) (available from Kanto Denka Kogyo Co., Ltd.; poly-fluoroolefin copolymer; refractive index: 1.43) was used. As light diffusive particles, EPOSTAR (registered trademark) MS (trade name) (available from Nippon Shokubai Co., Ltd.; spherical benzoguanamine resin particles; refractive index: 1.66; average particle size: 1 μm to 3 μm) was used.

To the hydroxyl group-containing acrylic resin and the fluororesin combined in amounts such that a mass ratio of the fluororesin to the hydroxyl group-containing acrylic resin (the fluororesin/the hydroxyl group-containing acrylic resin) was 30/70, an isocyanate curing agent TAKENATE (registered trademark) D-103H (available from Mitsui Chemicals, Inc.) was added in an amount such that an equivalent ratio (NCO/OH) was 1.1. To the mixture, 50 parts by mass of the light diffusive particles per 100 parts by mass of a resin solids-content were further added and mixed together with cyclohexanone in an amount such that a non-volatile content of a composition to be obtained was 20% by mass. The mixing was performed with an ultrasonic disperser to prepare a coating material composition.

The coating material composition thus obtained was coated on one surface of the transparent substrate with a bar coater (#40) such that a thickness after curing was 10 μm, and then dried at 80° C. for 10 minutes so as to form a light diffusing layer. The arithmetic mean roughness (Ra) of the surface of the light diffusing layer thus obtained measured with a laser ultra-depth microscope (VK-9700 available from Keyence Corporation) was 2.8 μm.

Example 2

The procedure of Example 1 was repeated except that the mass ratio of the fluororesin to the hydroxyl group-containing acrylic resin (the fluororesin/the hydroxyl group-containing acrylic resin) on a solids basis was 50/50, so as to form a light diffusing layer of this example. The arithmetic mean roughness (Ra) of the surface of the light diffusing layer thus obtained was 2.9 μm.

Example 3

The procedure of Example 1 was repeated except that WCU-865 (trade name) (available from DIC Corporation; refractive index: 1.49; hydroxyl value: 28; weight-average molecular weight: 20,000) was used as the hydroxyl group-containing acrylic resin, so as to form a light diffusing layer of this example. The arithmetic mean roughness (Ra) of the surface of the light diffusing layer thus obtained was 2.6 μm.

Example 4

The procedure of Example 1 was repeated except that ACRYDIC (registered trademark) A-814 (trade name) (available from DIC Corporation; refractive index: 1.49; hydroxyl value: 15; weight-average molecular weight: 30,000) was used as the hydroxyl group-containing acrylic resin, so as to form a light diffusing layer of this example. The arithmetic mean roughness (Ra) of the surface of the light diffusing layer thus obtained was 2.8 μm.

Comparative Example 1

The procedure of Example 1 was repeated except that the fluororesin was not added, so as to form a light diffusing layer of this example. The arithmetic mean roughness (Ra) of the surface of the light diffusing layer thus obtained was 2.4 μm.

Comparative Example 2

The procedure of Example 1 was repeated except that WBU-1218 (trade name) (available from DIC Corporation; refractive index: 1.49; hydroxyl value: 12; weight-average molecular weight: 70,000) was used as the hydroxyl group-containing acrylic resin, so as to form a light diffusing layer of this example. The arithmetic mean roughness (Ra) of the surface of the light diffusing layer thus obtained was 2.2 μm.

Comparative Example 3

The procedure of Example 1 was repeated except that ACRYDIC (registered trademark) 52-668BA (trade name) (available from DIC Corporation; refractive index: 1.49; hydroxyl value: 25; weight-average molecular weight: 63,000) was used as the hydroxyl group-containing acrylic resin, so as to form a light diffusing layer of this example. The arithmetic mean roughness (Ra) of the surface of the light diffusing layer thus obtained was 2.4 μm.

Comparative Example 4

The procedure of Example 1 was repeated except that ACRYDIC (registered trademark) 52-666BA (trade name) (available from DIC Corporation; refractive index: 1.49; hydroxyl value: 75.9; weight-average molecular weight: 15,000) was used as the hydroxyl group-containing acrylic resin, so as to form a light diffusing layer of this example. The arithmetic mean roughness (Ra) of the surface of the light diffusing layer thus obtained was 2.6 μm.

Comparative Example 5

As the hydroxyl group-containing acrylic resin, FU-355-BA (trade name) (available from DIC Corporation; refractive index: 1.49; hydroxyl value: 45; weight-average molecular weight: 16,000) was used. The procedure of Example 1 was repeated except that the mass ratio of the fluororesin to the hydroxyl group-containing acrylic resin (the fluororesin/the hydroxyl group-containing acrylic resin) was 80/20, so as to prepare a coating material composition. The transparent substrate coated with this composition resulted in poor leveling and uneven coating, in which edge portions were thick and the middle was thin.

Comparative Example 6

As the hydroxyl group-containing acrylic resin, FU-355-BA (trade name) (available from DIC Corporation; refractive index: 1.49; hydroxyl value: 45; weight-average molecular weight: 16,000) was used. The procedure of Example 1 was repeated except that the mass ratio of the fluororesin to the hydroxyl group-containing acrylic resin (the fluororesin/the hydroxyl group-containing acrylic resin) was 1/99, so as to form a light diffusing layer of this example. The arithmetic mean roughness (Ra) of the surface of the light diffusing layer thus obtained was 2.2 μm.

The respective optical members thus obtained were evaluated by the following methods. Table 1 summarizes the test results.

<Total Luminous Transmittance>

The total luminous transmittance (%) in each example was measured with a haze meter (NDH 2000 available from Nippon Denshoku Industries Co., Ltd.).

<Light Diffusibility Evaluation>

By use of an LED ceiling light HH-LC626A (available from Panasonic Corporation), the ability of masking a lamp image was visually observed with respect to the respective optical members. A part of a cover for lighting, attached to the LED ceiling light HH-LC626A, closest to the light source was cut out in a size of 50 mm×70 mm and replaced with each optical member, so that the ability of masking the lamp image was visually evaluated according to the following criteria.

A: The figure of the light source is not recognized at the same level as the cover for lighting attached.

B: The figure of the light source is blurred, but the ability is inferior to that of the cover for lighting attached.

C: The figure of the light source is recognized.

<Evenness of Coating>

Evenness of the coating after the curing was visually observed. An even coating was evaluated as A, and an uneven coating was evaluated as X.

TABLE 1

| | Ra (μm) | Total Luminous Transmittance (%) | Light Diffusibility | Evenness of Coating |
|---|---|---|---|---|
| Example 1 | 2.8 | 79.2 | A | A |
| Example 2 | 2.9 | 80.3 | A | A |
| Example 3 | 2.6 | 80.7 | A | A |
| Example 4 | 2.8 | 79.5 | A | A |
| Comparative Example 1 | 2.4 | 73.5 | B | A |
| Comparative Example 2 | 2.2 | 75.3 | A | A |
| Comparative Example 3 | 2.3 | 76.1 | A | A |
| Comparative Example 4 | 2.4 | 74.8 | A | A |
| Comparative Example 5 | 2.6 | 86.0 | C | X |
| Comparative Example 6 | 2.2 | 74.2 | B | A |

The test results in Table 1 show that the optical members according to the present embodiment have high total luminous transmittance and sufficient light diffusibility, so as to achieve high light utilization efficiency with the single light diffusing layer included. Comparative Examples that do not meet the requirements for the hydroxyl group-containing acrylic resin according to the present embodiment are inferior in the total luminous transmittance. Although Comparative Example 5 seemingly has high transmittance because the coating is partly thin, the coating is uneven and has poor light diffusibility.

In order to further investigate the high luminous transmittance in the present embodiment, Sample 1 only including resins and Sample 2 as a comparative example were prepared by the following procedure.

Sample 1

The acrylic plate used in Example 1 was used as the transparent substrate. In addition, FU-355-BA (trade name) was used as the hydroxyl group-containing acrylic resin, and KD100 (trade name) (available from Kanto Denka Kogyo Co., Ltd.; polyfluoroolefin copolymer; refractive index: 1.43) was used as the fluororesin, as in the case of Example 1. Coating materials having different mass ratios of the fluororesin to the hydroxyl group-containing acrylic resin (the fluororesin/the hydroxyl group-containing acrylic resin), 0/100, 10/90, 30/70, and 100/0 were prepared with cyclohexanone mixed together in an amount such that a non-volatile content was 20% by mass, whereas no dispersive particles were added thereto.

Each coating material thus obtained was coated on one surface of the transparent substrate with a bar coater (#40), and then dried at 80° C. for 10 minutes, so as to prepare Sample 1 including a transparent resin layer.
Sample 2 The procedure of Sample 1 was repeated except that WBU1218 (trade name) used in Comparative Example 2 was used as the hydroxyl group-containing acrylic resin, so as to prepare Sample 2 including a transparent resin layer.
<Evaluation>

Figure 2:
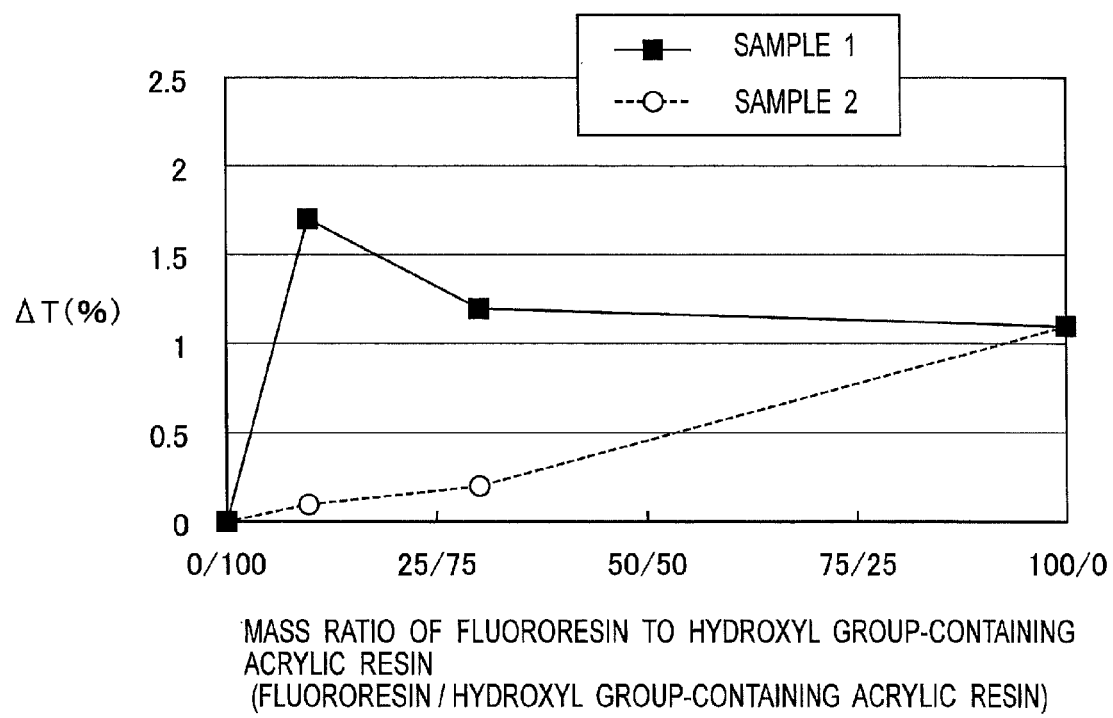
FIG. 2 is a graph showing a change in total luminous transmittance in each mass ratio of a fluororesin to a hydroxyl group-containing acrylic resin.

The total luminous transmittance (%) was measured in the same manner as in the respective examples. FIG. 2 shows the test results. FIG. 2 is a graph showing a change of the total luminous transmittance in the respective mass ratios of the fluororesin to the hydroxyl group-containing acrylic resin. The vertical axis of the graph represents a difference $\Delta T$ (%) between transmittance $T_0$ and each transmittance $T_0$, $T_{10}$, $T_{30}$, and $T_{100}$ in the respective mass ratios of the fluororesin to the hydroxyl group-containing acrylic resin (the fluororesin/the hydroxyl group-containing acrylic resin), 0/100, 10/90, 30/70, and 100/0 ($T_x$–$T_0$, where x=0, 10, 30, and 100).

FIG. 2 clearly shows that Sample 1 with the hydroxyl group-containing acrylic resin and the fluororesin combined in predetermined amounts results in greatly-improved total luminous transmittance when the fluororesin is added in a small amount and has a higher total luminous transmittance than the case of only including the fluororesin. Sample 2, on the other hand, has total luminous transmittance that increases as the amount of the fluororesin added increases. This is presumably because Sample 1 does not lose film uniformity in the mixture of the hydroxyl group-containing acrylic resin and the fluororesin, and the fluororesin having a lower refractive index is present in a higher concentration on the surface side.

Accordingly, a combination of the hydroxyl group-containing acrylic resin and the fluororesin having the particular physical properties can achieve higher light utilization efficiency in addition to the light diffusing effects with the single light diffusing layer used, and is therefore suitable for use in covers for lighting fixtures.

The entire content of Japanese Patent Application No. P2013-247043 (filed on Nov. 29, 2013) is herein incorporated by reference.

While the present invention has been described above by reference to the examples, the present invention is not intended to be limited to the descriptions thereof, and various modifications and improvements will be apparent to those skilled in the art.

INDUSTRIAL APPLICABILITY

The coating material composition according to the present invention can provide the light diffusing properties capable of uniformly diffusing light while effectively masking a light source image. Further, the light diffusing layer can achieve high luminous transmittance without including an additional low refractive index layer on the light diffusing layer.

REFERENCE SIGNS LIST

1 LIGHT DIFFUSING MEMBER
2 TRANSPARENT SUBSTRATE
3 LIGHT DIFFUSING LAYER
4 LIGHT DIFFUSIVE PARTICLES

The invention claimed is:
1. A coating material composition for forming a light diffusing layer comprising a hydroxyl group-containing acrylic resin, a polyfluoroolefin resin, and light diffusive particles, the hydroxyl group-containing acrylic resin having a weight-average molecular weight in a range of 10,000 to 30,000 and a hydroxyl value in a range of 14 to 70,
    wherein a mass ratio of the polyfluoroolefin resin to the hydroxyl group-containing acrylic resin is in a range of 5/95 to 50/50.
2. The coating material composition for forming a light diffusing layer according to claim 1, wherein a refractive index difference between the light diffusive particles and the hydroxyl group-containing acrylic resin is in a range of 0.05 to 0.25, and an average particle size ($d_{50}$) of the light diffusive particles is in a range of 0.8 μm to 15 μm.
3. A light diffusing member comprising a transparent substrate and a light diffusing layer applied on one surface of the transparent substrate, the light diffusing layer being formed of the coating material composition for forming a light diffusing layer according to claim 1.
4. The light diffusing member according to claim 3, wherein a proportion of the polyfluoroolefin resin with respect to the hydroxyl group-containing acrylic resin by mass in the light diffusing layer is larger on a surface side of the light diffusing layer than on a transparent substrate side.
5. The light diffusing member according to claim 3, wherein an arithmetic mean roughness (Ra) of a surface of the light diffusing layer is in a range of 1 μm to 10 μm.
6. A cover for lighting comprising the light diffusing member according to claim 3.
7. The coating material composition for forming a light diffusing layer according to claim 1, wherein the light diffusive particles are contained in an amount from 25 to 150 parts by mass based on 100 parts by mass of the hydroxyl group-containing acrylic resin and the polyfluoroolefin resin combined together.

* * * * *